United States Patent [19]

Saito et al.

[11] Patent Number: 4,983,012
[45] Date of Patent: Jan. 8, 1991

[54] OPTICAL FIBER CONNECTOR

[75] Inventors: Kazuhito Saito; Toshiaki Kakii; Hidetoshi Ishida; Shuzo Suzuki, all of Kanagawa, Japan

[73] Assignee: Sumitomo Electric Industries, Ltd., Osaka, Japan

[21] Appl. No.: 512,415

[22] Filed: Apr. 23, 1990

[30] Foreign Application Priority Data

Jun. 23, 1989 [JP] Japan .................................. 1-161676

[51] Int. Cl.$^5$ .............................................. G02B 6/38
[52] U.S. Cl. ............................... 350/96.21; 350/96.20; 350/96.22
[58] Field of Search ............... 350/96.20, 96.21, 96.22

[56] References Cited

U.S. PATENT DOCUMENTS

| 3,864,018 | 2/1975 | Miller | 350/96.21 |
|---|---|---|---|
| 4,214,812 | 7/1980 | de Mendez | 350/96.21 |
| 4,657,341 | 4/1987 | Sammueller | 350/96.22 |
| 4,762,390 | 8/1988 | Finzel | 350/96.21 |
| 4,772,088 | 9/1988 | Finzel | 350/96.21 |
| 4,778,243 | 10/1988 | Finzel | 350/96.21 |
| 4,818,058 | 4/1989 | Bonanni | 350/96.20 |
| 4,818,059 | 4/1989 | Kakii et al. | 350/96.21 |
| 4,830,456 | 5/1989 | Kakii et al. | 350/96.20 |
| 4,836,638 | 6/1989 | Finzel | 350/96.21 |
| 4,921,325 | 5/1990 | Iri et al. | 350/96.21 |

FOREIGN PATENT DOCUMENTS

| 55-101904 | 8/1980 | Japan | 350/96.22 X |
|---|---|---|---|
| 62-269108 | 11/1987 | Japan | 350/96.22 X |
| 63-56619 | 3/1988 | Japan | 350/96.22 X |
| WO85/02025 | 5/1985 | PCT Int'l Appl. | 350/96.22 X |

Primary Examiner—Brian Healy
Attorney, Agent, or Firm—Cushman, Darby & Cushman

[57] ABSTRACT

An optical connector comprises an optical fiber guide member consisting of a grooved substrate and a cover plate, the substrate having optical fiber guide grooves and guide pin grooves cut into its top surface, and the cover plate being joined to the substrate to cover the optical fiber guide grooves but to leave at least part of the guide pin grooves exposed; a pressing member which is movable in the vertical direction of the guide pin grooves and is provided above the guide pin grooves to elastically press guide pins which are positioned on the guide pin grooves downward; and coupling clips enhancing the force of elastic pressure being exerted on the guide pins so as to secure the joining of optical fibers.

4 Claims, 2 Drawing Sheets

OPTICAL FIBER CONNECTOR

FIELD OF THE INVENTION

The present invention relates to an optical connector for use in optical communications to connect optical fibers in proper alignment with each other in such a way that they can be disconnected as required.

BACKGROUND OF THE INVENTION

FIGS. 1A and 1B show a conventional optical connector fabricated by the transfer molding of an epoxy resin. FIG. 1A is a perspective view of the connector before the connection, and FIG. 1B shows an end face of the connector.

An optical connector ferrule 20 molded from epoxy resin has optical fiber guide holes 21 and two guide pin holes 22 formed in its interior. The guide holes 21 are used to fix, in proper alignment, coated optical fibers A after the coating layer of an end portion is stripped to expose the individual fibers. In order to connect these optical fibers, they are inserted into the guide holes 21 and fixed in proper axial alignment. Thereafter, two guide pins 23 are inserted the respective pin holes 22.

In the optical connector, as shown in FIGS. 1A and 1B, which connects optical fibers in proper axial alignment by inserting guide pins into respective pin holes, it is necessary that the bore diameter of each pin hole 22 be greater than the outside diameter of the guide pin 23.

However, if the clearance (g) between the bore diameter of the pin hole 22 and the outside diameter of the guide pin 23 is excessive, optical fibers cannot be connected with high precision of positioning. In particular, when the optical fibers to be connected are single-mode optical fibers having a core diameter of only about 9–10 μm or dispersion-shifted optical fibers having a core diameter less than the single-mode optical diameter, it is very difficult to accomplish low-loss and consistent connection of the optical fibers.

Therefore, it is necessary to produce the guide pin holes and guide pins with extremely high dimensional accuracy in its bore diameter and outer diameter, respectively. However, the production cost increases and considerable skill is required to accomplish connecting operations in a consistent way.

SUMMARY OF THE INVENTION

The present invention provides an optical connector to solve the above mentioned conventional problems. The optical connector according to the present invention comprises: an optical fiber guide member consisting of a grooved substrate and a cover plate, the substrate having optical fiber guide grooves and guide pin grooves cut into its top surface, and the cover plate being joined to the substrate to cover the optical fiber guide grooves but to leave at least part of the guide pin grooves exposed; a pressing member which is movable in the vertical direction of the guide pin grooves and is provided above the guide pin grooves to elastically press guide pins which are positioned on the guide pin grooves downward; and coupling clips enhancing the force of elastic pressure being exerted on said guide pins so as to secure the joining of optical fibers.

DETAILED DESCRIPTION OF PREFERRED EMBODIMENT

Figure 1A:
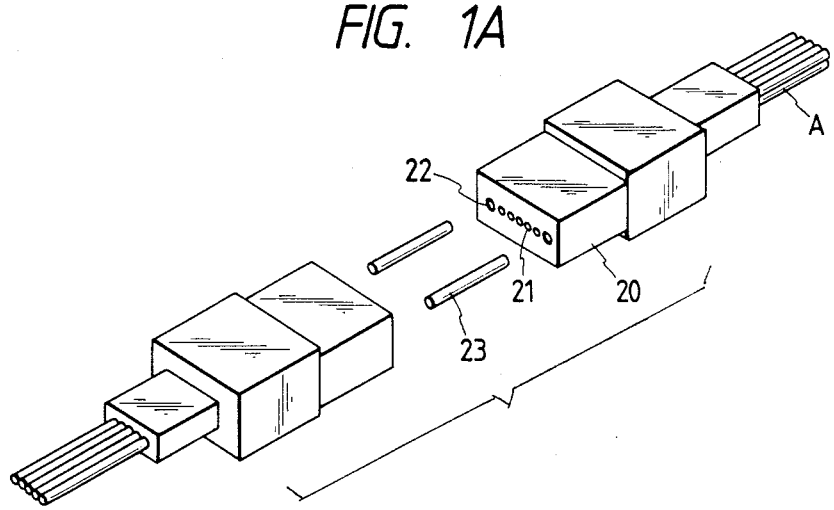
FIGS. 1A and 1B show schematically a conventional optical connector fabricated by the transfer molding of an epoxy resin, with FIG. 1A being a perspective view of the connector before it joins optical fibers, and FIG. 1B showing an end face of the connector into which guide pins are inserted for coupling of optical fibers.
Figure 1B:
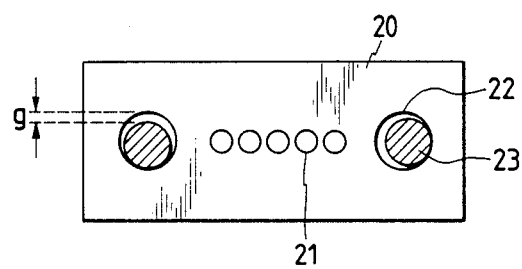
Figure 2:
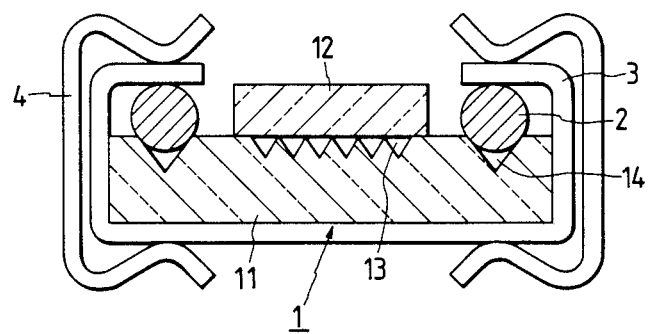
FIG. 2 is a cross section showing an example of the optical connector of the present invention.

FIG. 2 is a cross section showing a specific example of the optical connector of the present invention.

In the drawing, the reference numeral 1 designates an optical fiber guide member which comprises a grooved substrate 11 and a cover plate 12. The substrate 11 has optical fiber guide grooves 13 and guide pin grooves 14 cut in its top surface, and the cover plate 12 is joined to the substrate 11 so that the fiber guide grooves 13 are covered by the plate 12 but at least part of the guide pin grooves 14 is exposed. A pressing member 3 movable in the vertical direction of the guide pin grooves 14 is provided above the guide grooves so that the guide pins 2 which are positioned on the guide pin grooves are pressed downward when optical fibers are connected by the optical connector. When two plugs are connected, coupling clips 4 are mounted so that the movable member 3 will be pressed downward to enhance the force of elastic pressure being exerted on the guide pins 2.

In the optical connector of the present invention, at least part of the guide pin grooves 14 in the optical fiber guide member 1 is exposed and the guide pins 2 positioned on the guide pin grooves 14 are elastically pressed downward by the movably member 3 lying above which is movable in the vertical direction of the grooves. As a result, each guide pin 2 will always be held in contact with both inner surfaces of the V-shaped guide pin groove 14 on which it is positioned.

Thus, even if there is some variation in the outside diameter of guide pins 2, they can be securely fixed to the grooved substrate 1 by adjusting the height of the vertically movable member 3 and, as a result, the clearance between guide pins and guide pin holes in the conventional optical connector can be entirely eliminated. This means that the possibility of axial misalignment of optical fibers on account of the clearance can be completely eliminated. If the guide pins 2 can always be held in contact with the guide pin grooves 14, the factor that will induce axial misalignment of optical fibers is only the position of guide pin grooves 14 in the substrate 1 as relative to the optical fiber guide grooves 13. Since this problem can satisfactorily be dealt with by adopting a technique capable of high-precision working, the optical connector of the present invention insures low-loss coupling of optical fibers.

When optical fibers are joined by the optical connector of the present invention, guide pins 2 are elastically pressed downward by the vertically movable member 3. The greater force by which the guide pins are depressed, the more consistently the guide pins are held in contact with the guide pin grooves 14. On the other hand, the increase in the force of depression will lead to an increase in frictional resistance that develops when guide pins 2 are inserted into or extracted from the optical connector and, as a result, the efficiency of inserting the guide pins 2 into the gap between the movable member 3 and the guide pin grooves 14 in the substrate 1 or extracting them from said gap will be impaired.

This problem can be solved by adopting a mechanism in which guide pins 2 are pressed in two stages. First, the guide pins are held temporarily by the elastic force of pressure that is exerted by the movable member 3. Second, in order to enhance the force of pressure, the two plugs coupled together by inserting the guide pins 2 are equipped with coupling clips 4 externally so that they will depress the movable member 3.

Figure 3A:
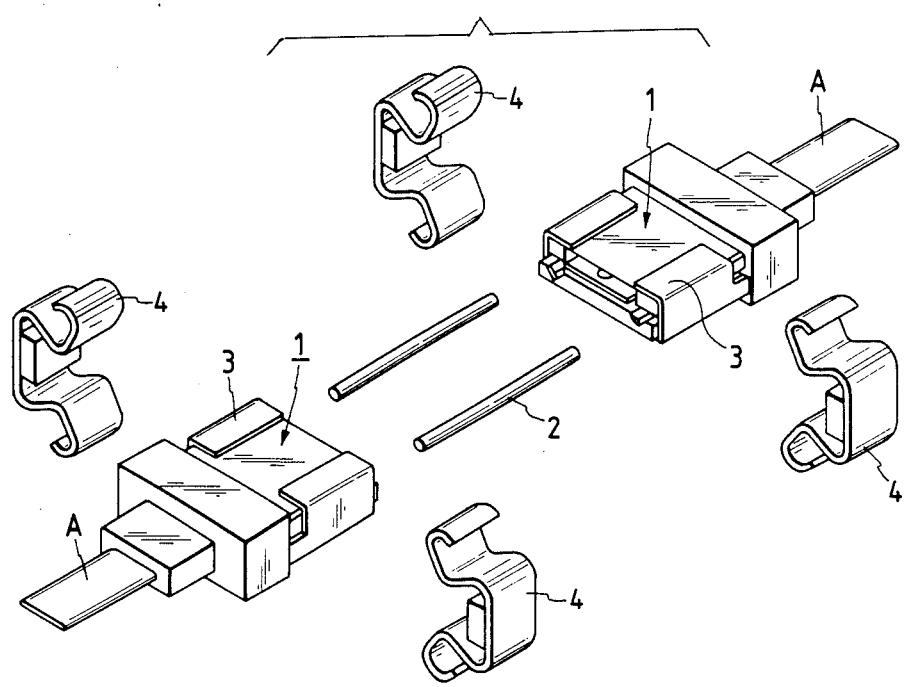
FIGS. 3A and 3B show schematically a specific embodiment of the optical connector of the present invention, with FIG. 3A being a perspective view of the coupler before it joins optical fibers, and FIG. 3B being a perspective view of coupled plugs of the connector.
Figure 3B:
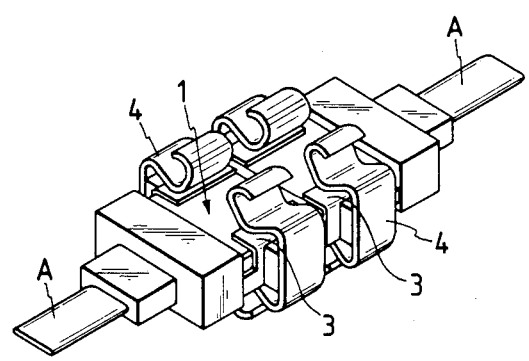

FIGS. 3A and 3B show an embodiment of the present invention in which it is applied to a multi-fiber optical connector capable of jointing twelve single-mode fibers in one operation. FIG. 3A is a perspective view of the optical connector before it joins optical fibers, and FIG. 3B is a perspective view showing two plugs of connector coupled together.

The optical fiber guide member 1 consists of two silicon chips, one being grooved and the other being flat. The silicon chips are made of single-crystal silicon which is suitable for grinding machining because of high grinding ratio. Twelve optical fiber guide grooves and two guide pin grooves are formed on the top surface of the grooved chip by grinding, and the flat chip is bonded to the fiber guide grooves by means of a thin-film adhesive.

The optical fiber guide member 1 is partly surrounded by a press-worked stainless steel which is bonded to all sides except the top surface of the guide member in such a way that the movable member 3, which is movable in the vertical direction of the guide pin grooves and is a part of the stainless steel member, is positioned slightly above the guide pin grooves. When the guide pins 2 having an outside diameter of about 0.7 mm are inserted into the guide pin grooves, the vertically movable member 3 will deform by about 50 $\mu$m to exert a pressing force of about 1 kg on the guide pins 2. In this instance, a resistance less than about 200 gf will develop upon insertion or extraction of the guide pins 2 but this is not so great as to preclude manual insertion or extraction of guide pins 2 without using any special tools.

When two plugs of the optical connector described above are coupled together with one plug abutting against the other, satisfactorily low-loss connection of optical fibers can be accomplished even if the guide pins are pressed downward by the relatively small amount of force mentioned above. However, if a tensile force is exerted on the coupled plugs, the coupling of the plugs is not capable of withstanding the force that exceeds a load corresponding to the drag resistance of the two guide pins 2. In order to improve the repeatability of coupling accuracy of the two plugs of the optical connector and to decrease the deviation of the coupling loss of the optical connector, it obviously is more advantageous to further increase the force by which the guide pins are pressed downward.

Hence, the two-stage pressure application is performed as already stated above and an additional pressure is applied by means of coupling clip 4 which are mounted after the two plugs of optical connector are coupled. Each plug is equipped with two clips 4 in such a way that the force of pressure exerted on the associated guide pins is enhanced. Thus, as shown in FIG. 3B, a total of four coupling clips 4 are used to couple the two plugs. The clips 4 are advantageously made of a beryllium-copper alloy or a SUS spring steel.

In the embodiment under discussion, each of the coupling clips 4 is designed to have a grip force of 3 kgf per each. In order to improve the operational efficiency, the coupling clips 4 are mounted or dismounted by a special tool.

In an experiment conducted with the optical connector of the present invention, the force required for the guide pin to be inserted or extracted increased to about 0.8–1 kgf per each when the connector was equipped with the coupling clips 4, and this guaranteed that the optical connector was capable of withstanding an applied tensile force ranging from about 1.5 to 2 kgf. In addition, optical fibers could be connected or disconnected in a consistent way and the variations in coupling loss were less than 0.05 in terms of standard deviations ($\sigma$).

As described above, the optical connector of the present invention is characterized in that a member capable of moving in the vertical direction of guide pin grooves that presses guide pins downward is provided above the guide pin grooves. Thus, even if there are some variations in the outside diameter of the guide pins, such deviation will be easily absorbed to insure that two plugs of the optical connector can be coupled without any trouble. Consequently, the optical connector of the present invention accomplishes low-loss coupling of optical fibers in a consistent way and yet this connector can be fabricated at low cost since it eliminates the need for strict dimensional control of the outside diameter of guide pins.

The optical connector of the present invention is further characterized in that the guide pins are pressed downward in two stages. First, the guide pins inserted are retained temporarily by a comparatively weak force by means of the vertically movable member, so they can be handled manually with great ease. Second, in order to secure the coupling of the plugs, the coupling clips are externally applied to the plugs so that the guide pins are further pressed downward and gripped more effectively to realize a firm and reliable joining of optical fibers.

What is claimed is:

1. An optical connector for connecting optical fibers in proper axial alignment with each other, said optical connector comprises:

an optical fiber guide member consisting of a grooved substrate and a cover plate, said substrate having optical fiber guide grooves and guide pin grooves cut into a top surface thereof, and said cover plate being joined to said substrate in such a way that it covers the optical fiber guide grooves but leaves at least part of the guide pin grooves exposed;

a member being movable in the vertical direction of the guide pin grooves and positioned above said grooves in such a way that said movable member elastically presses downward guide pins positioned on said guide pin grooves when optical fibers are joined by said optical connector; and coupling clips for enhancing the force of elastic pressure being exerted on said guide pins so as to secure the joining of optical fibers.

2. An optical connector according to claim 1, wherein the force of pressure by which the guide pins are pressed downward by means of said vertically movable member in the absence of the coupling clips is no more than 500 gf in terms of the force required for insertion or extraction of said guide pins.

3. An optical connector according to claim 1, wherein said guide pins are held in contact with inner two surfaces of the guide pin grooves.

4. An optical connector according to claim 1, wherein said optical fiber guide grooves and guide pin grooves on said substrate are V-shaped grooves.

* * * * *